United States Patent [19]
Yew et al.
[11] 4,129,817
[45] Dec. 12, 1978

[54] STEPPED VOLTAGE POWER SUPPLY WITH EQUALIZED DISCHARGE OF BATTERY CELLS

[75] Inventors: Ming-Chih Yew, Rochester; Trevor O. Jones, Birmingham, both of Mich.

[73] Assignee: General Motors Corporation, Detroit, Mich.

[21] Appl. No.: 826,372

[22] Filed: Aug. 22, 1977

[51] Int. Cl.$^{2}$ .......... H02J 7/00; H02P 7/00

[52] U.S. Cl. .......... 320/18; 200/180; 318/139; 320/15

[58] Field of Search .......... 320/6-8, 320/15-18; 318/139; 200/180; 307/77, 80

[56] References Cited

U.S. PATENT DOCUMENTS

| | | | |
|---|---|---|---|
| 1,932,961 | 10/1933 | Fay et al. | 318/139 |
| 3,134,063 | 5/1964 | Hastings, Jr. | 318/139 |
| 3,168,688 | 2/1965 | Roggenkamp | 318/17 |
| 3,249,836 | 5/1966 | Stamm | 318/17 |
| 3,886,426 | 5/1975 | Daggett | 320/7 |

*Primary Examiner*—Robert J. Hickey
*Attorney, Agent, or Firm*—Robert M. Sigler

[57] ABSTRACT

The adjacent terminals of adjacent battery cells are grouped in regularly spaced pairs of contacts. A first commutating member has a plurality of regularly spaced contact members effective to connect the contacts of each pair but one and is movable sequentially through a plurality of positions to vary the unconnected contact pair. One of the contact members adjacent the unconnected contact pair provides a first output terminal. A second commutating member has a single contact member effective to connect the contacts of one of said pairs and provide a second output terminal and is movable sequentially through a plurality of positions to vary the connected contact pair. Actuator means are movable sequentially through a plurality of positions in a first direction and a second direction and are connected through a unidirectional clutch to the second commutating member to move it in one direction to increase the number of cells connected across the output terminals with movement of the actuator means in its first direction and through a unidirectional clutch to the first commutating member to move it in the same one direction to decrease the number of cells connected across the output terminals with movement of the actuator means in its second direction, thereby varying the output voltage in a stepped fashion and equalizing the discharge of the individual cells with such variation.

2 Claims, 7 Drawing Figures

STEPPED VOLTAGE POWER SUPPLY WITH EQUALIZED DISCHARGE OF BATTERY CELLS

BACKGROUND OF THE INVENTION

This invention relates to stepped voltage electric power supplies including battery cells as the prime source of electric power and especially to such power supplies adaptable for use in powering motor vehicles. It is well known in an electric powered motor vehicle to vary the speed of the vehicle by controlling the voltage of the power supply applied to the vehicle's motor; and a particularly simple way of accomplishing this with a multi-celled power supply is to vary the number of cells connected in series and thereby vary the output voltage in step-wise fashion. Unfortunately, the direct application of a straight-forward switch in this application leads to the premature discharge of those battery cells switched in first at low speed compared with those battery cells which are not switched in until high speeds, since the former are used more than the latter. Realization of this fact has led to the suggestion of a number of rather complex and awkward switching schemes to vary the cells used in such switching apparatus and thereby equalize the discharge of the cells.

SUMMARY OF THE INVENTION

This invention proposes a greatly simplified apparatus for supplying a stepped voltage output from a plurality of battery cells and varying the individual cells used with changes in said output to equalize the discharge of the individual cells and thereby obtain maximum power from the cells before they must be replaced or recharged.

The invention contemplates a first cummutating element effective to connect the individual cells in series and establish an output terminal at one end thereof and a second commutating element effective to connect two adjacent cells in series and establish a second output terminal at the junction thereof. These commutating members are engaged to actuator means controlled by an operator through unidirectional clutch means which provide movement of the second cummutating member in one direction with movement of the actuator means in a first direction to increase the number of cells connected between the output terminals and movement of the first commutating member in the same one direction with movement of the actuator means in the reverse direction to reduce the number of cells connected between the output terminals.

The result is that, with each movement of the actuator means to change the output voltage, a different set of cells is connected between the output terminals. Thus, over a period of use, the discharge on the individual cells is equalized for maximum range of the vehicle. Further details and advantages of the invention will be apparent from the accompanying drawings and following description of a preferred embodiment.

SUMMARY OF THE DRAWINGS

Referring to FIG. 1, a stepped voltage electric power supply includes a case 10 for switching apparatus. Case 10 includes actuator means comprising a shaft 11 carrying a driving gear 12, which meshes in differential fashion with a gear 14 carried on a shaft 15 and a gear 17 carried on a shaft 18. Shaft 11 of the actuating means can be provided on the outside of case 10 with an actuating and indicating knob 19 as shown in FIG. 7.

Figure 2:
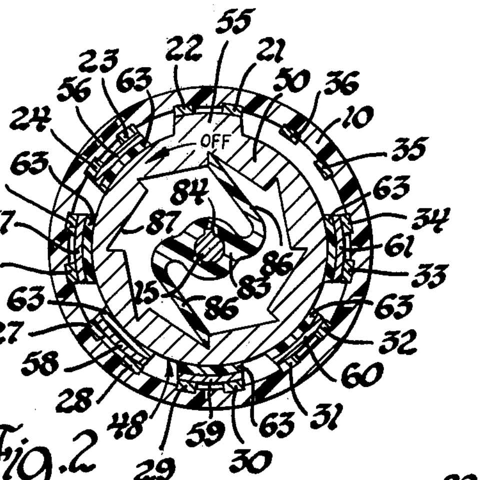
FIG. 2 is a section view along lines 2—2 of FIG. 1.
Figure 4:
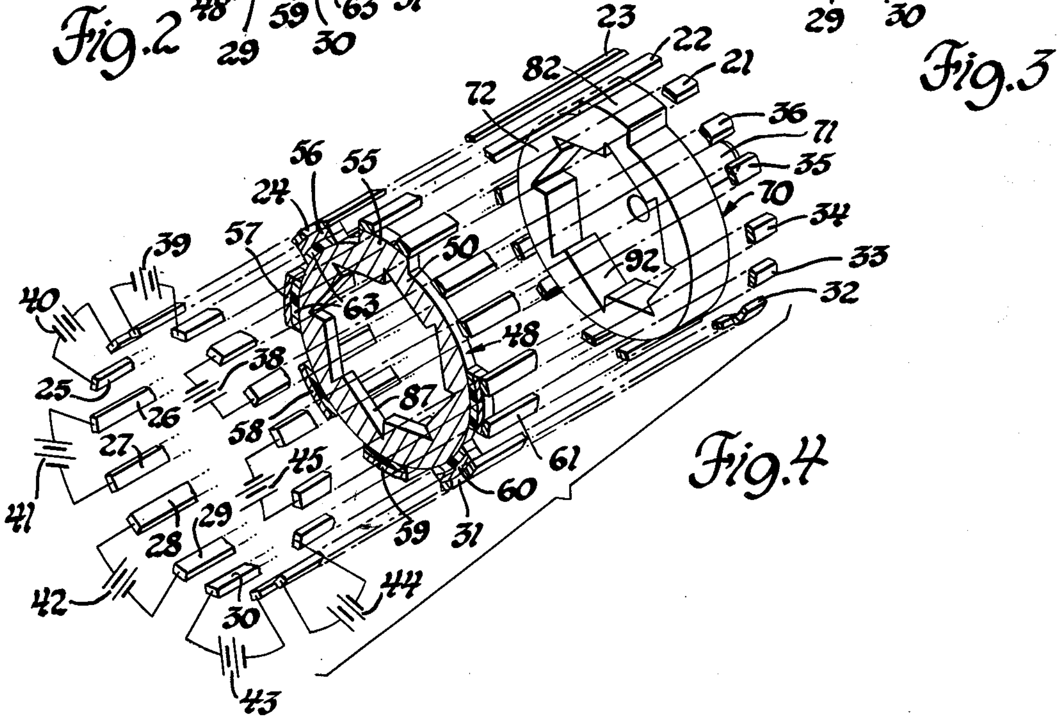
FIG. 4 is an exploded view of a portion of the apparatus of FIG. 1 in a first position.

Case 10 is generally cylindrical in shape and provided, around the inner periphery thereof, with a plurality of electrically conducting contact strips 21–36, aligned parallel to the axis of case 10 and regularly spaced around the periphery thereof in pairs such as 21–22, 23–24, etc., as shown in FIG. 2. The contact strips 21–36 are adapted to be connected to the terminals of battery cells 38–45, as shown in FIG. 4. Each battery cell is connected between the adjacent contact strips of adjacent pairs, as, for example, battery cell 38 connected between contact strips 21 and 36, battery cell 39 connected between contact strips 22 and 23, etc. Battery cells 38–45 are oriented with a consistent plurality so that, if the contact strips of a pair are electrically connected, the corresponding battery cells are connected in series with a combined voltage equal to the sum of the individual voltages.

Figure 1:
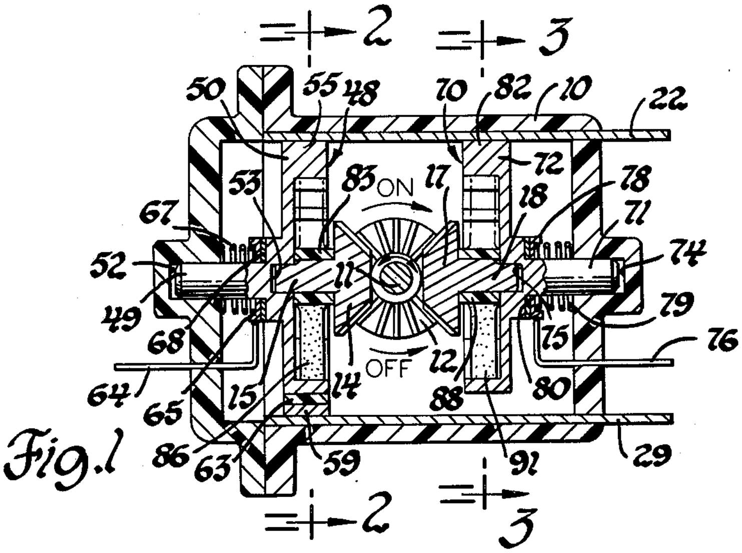
FIG. 1 shows a side cutaway view of apparatus according to this invention.

Referring to FIGS. 1 and 2, case 10 includes a first commutating member 48, which includes a shaft 49 and ring portion 50. Shaft 49 is disposed in a receiving pocket 52 of case 10 and is axially aligned with shaft 15, which is rotatably received in a receiving pocket 53 of first commutating member 48.

As seen in FIG. 2, ring portion 50 of first commutating member 48 is provided with a plurality of electrically conducting contact members 55–61 around its outer periphery. Contact member 55 is integral with, and therefore electrically connected with, ring portion 50; but contact members 56–61 are all electrically insulated from ring portion 50 by insulator members 63. Contact members 55–61 are equally spaced around the periphery of ring portion 50 as if there were eight instead of seven, but with a space left open for the nonexistent eighth. Each of contact members 55–61 is efective to close a pair of contacts when first commutating member 48 is rotated to an appropriate position. For instance, in FIG. 2, contact member 55 connects contact strips 21 and 22; contact member 56 connects contact strips 23 and 24, etc. An external terminal member 64 projects through case 10 and is connected to a slip ring or similar current collector 65, which is urged by a spring 67 into contact, through a conducting washer 68, with ring portion 50.

Figure 3:
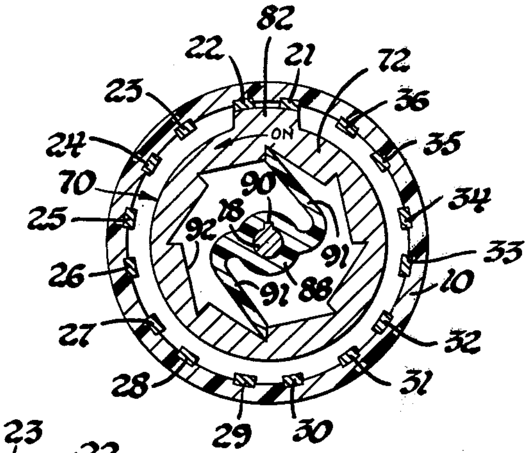
FIG. 3 is a section view along lines 3—3 of FIG. 1.

As seen in FIGS. 1 and 3, a second commutating member 70 comprises a shaft 71 and ring portion 72. Shaft 71 is received in a receiving pocket 74 of case 10 and itself includes a receiving pocket 75 for receiving shaft 18. An external terminal member 76 projects through case 10 and is connected to a slip ring 78, similar to slip ring 65, which is biased by a spring 79 into electrical contact through a conducting washer 80 with ring portion 72.

Referring to FIG. 3, ring portion 72 is provided with a single contact member 82 capable of connecting any of the pairs of contacts, such as 21–22, 23–24, etc. as second commutating member 70 is rotated. Contact member 82 is integral with, and therefore electrically connected to, ring portion 72 and therefore to external terminal member 76.

Referring to FIG. 2, a driving clutch member 83 is keyed to shaft 15 with key 84. Clutch member 83 is made of a plastic material and includes a pair of resilient arms 86 which engage a unidirectional clutch surface 87 on ring portion 50. it can be seen in FIG. 2 that the interaction of arms 86 and unidirectional clutch surface 87 is such that rotation of shaft 15 in the counterclockwise direction causes ring portion 50 to likewise rotate in the counterclockwise direction but rotation of shaft 15 in the clockwise direction results in no rotation of ring portion 50.

Likewise, referring to FIG. 3, a driving clutch member 88 is keyed to shaft 18 with a key 90. Member 88 is similar to member 83 and includes a pair of arms 91 which engage a unidirectional clutch surface 92 in ring portion 72. The interaction between arms 91 and unidirectional clutch surface 92 is such that rotation of shaft 18 in a counterclockwise direction is effective to drive ring portion 72 in a counterclockwise direction while rotation of shaft 18 in a clockwise direction produces no rotation of ring portion 72.

The output voltage obtained across terminals 64 and 76 is, at any time, determined by the number of battery cells connected in series between contact member 55 on first commutating member 48 and contact member 82 on second commutating member 70. The number of cells between contact members 55 and 82 are determined by the rotational positions of commutating members 48 and 70, which are determined by the rotations of control knob 19 and shaft 11. A suitable detent mechanism, not shown or described here, could be provided to define specific positions for control knob 19 for assistance to the operator; such mechanisms are well known.

The operation of the apparatus will now be described for a typical sequence of zero voltage output to three cells output and back to zero voltage output. The initial position of the apparatus is as shown in FIG. 4. Contact members 55 and 82 are both connecting the same contact strips 21 and 22 and there is thus a zero voltage potential across terminals 64 and 76. The position of control knob 19 for this initial condition is shown in FIG. 7a.

Figure 5:
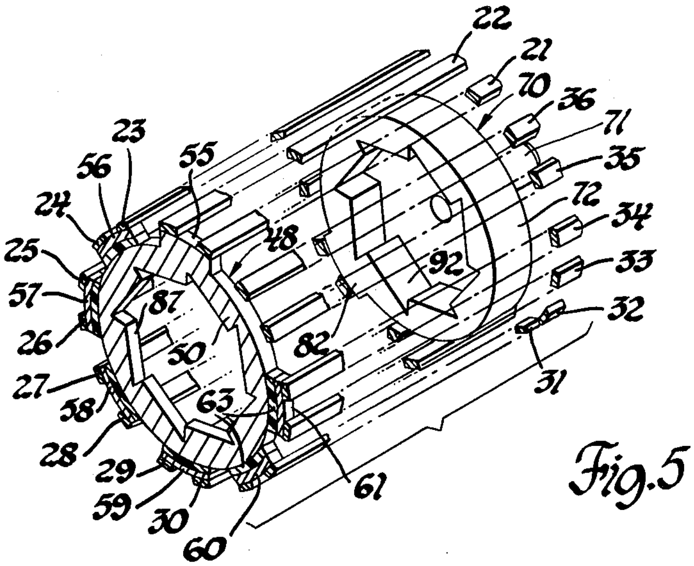
FIG. 5 is an exploded view of the apparatus of FIG. 4 in a second position.

When the operator wishes to produce the voltage output of three cells, he turns knob 19 to the position shown in 7b. Shaft 11 is rotated thereby in the clockwise or on direction shown in FIG. 1, which rotates shaft 15 in the clockwise direction of FIG. 2 and shaft 18 in the counter-clockwise direction of FIG. 3. Thus, first commutating member 48 is not moved; while second commutating member 70 is rotated through three positions in the counterclockwise direction. The result is as shown in FIG. 5, where contact member 55 connects contact strips 21–22 while contact member 82 of second commutating member 70 connects contact strips 27 and 28.

Referring to FIG. 4, it can be seen that battery cell 41 is connected between contact strips 26 and 27, battery cell 40 is connected between strips 24 and 25 and battery cell 39 is connected between contact strips 23 and 22. Referring to FIG. 5, it can be seen that contact member 57 connects contact strips 25 and 26, while contact member 56 connects contact strips 23 and 24. Thus the three battery cells 39, 40 and 41 are connected in series between contact members 55 and 82 thus between terminals 64 and 76 for a three cell voltage output.

Figure 6:
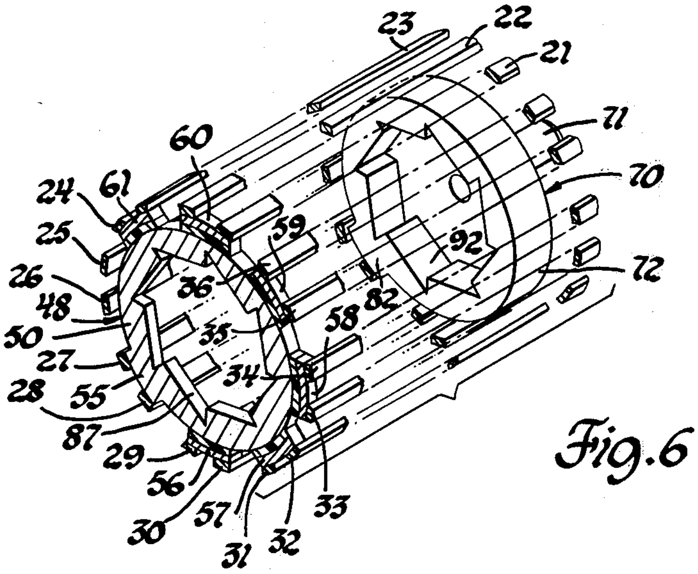
FIG. 6 is an exploded view of the apparatus of FIG. 4 in a third position.
Figure 7:
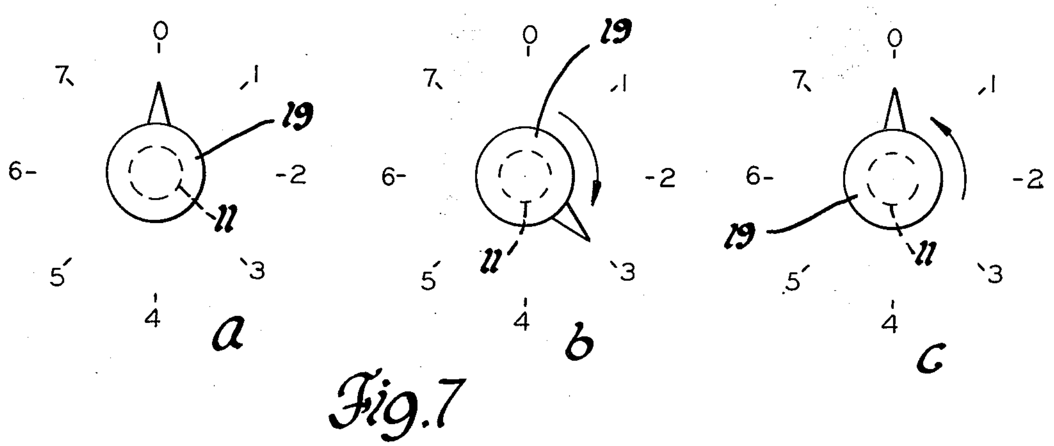
FIG. 7 is a view of typical actuator and voltage output indicating means for the apparatus of FIG. 1 shown in positions a, b and c which correspond to positions of the apparatus shown in FIGS. 4, 5 and 6, respectively.

When the operator wishes to decrease the output to zero once again, he rotates knob 19 in the counterclockwise direction to the position shown in FIG. 7*c*. This rotates shaft 11 in the counterclockwise or off direction of FIG. 1 and causes first commutating member 48 to move three positions in the counterclockwise direction of FIG. 2 while second commutating member 70 does not move. The result is as shown in FIG. 6. It can be seen that both contact members 55 and 82 once again connect the same contact strips; this time, 27 and 28. There is thus a net zero voltage output across terminal 64 and 76. However, the position of FIG. 6 is not identical with that of FIG. 4, since both commutating members 48 and 70 have rotated three positions. Thus, if the operator were to repeat his call for a three-cell voltage output as in FIG. 7*b*, second commutating member 70 would be rotated three positions further to place three battery cells across terminals 64 and 76. However, this time the battery cells would be numbers 42, 43 and 44.

It can be seen, as the control knob 19 and shaft 11 are repeatedly moved back and forth between different desired output voltage levels and the first and second commutating members are thus alternately rotated in the same direction, that the particular battery cells as well as the number of battery cells connected between terminals 64 and 76 will be constantly changed. This will, over a period of time, tend to equalize the current drain on the individual battery cells so that one or a few will not be depleted prematurely.

The specific embodiment descirbed above is a preferred embodiment; but equivalent embodiments will occur to those skilled in the art. Therefore, this invention should be limited only by the claims which follow.

The embodiments of the invention in which an exclusive property or privilege is claimed are defined as follows:

1. A stepped voltage electric power supply for a vehicle mounted electric motor, comprising, in combination:

a plurality of regularly spaced contact pairs;

a first commutating member having a plurality of regularly spaced contact members effective to connect the contacts of each pair but one, the commutating member being movable sequentially through a plurality of positions, each position providing a different unconnected contact pair, one of the contact members adjacent the unconnected contact pair providing a first output terminal;

a plurality of electric power cells, each cell being connected in a consistent polarity between the adjacent contacts of adjacent contact pairs and each contact pair being connected to its adjacent contact pairs on either side by such cells, whereby the contact members of the first commutating member are effective to connect the cells in series;

a second commutating member having a single contact member effective to connect the contacts of one of said pairs and provide a second output terminal, the second commutating member being movable sequentially through a plurality of positions, each position providing a different connected contact pair;

actuator means movable sequentially through a plurality of positions in a first, output voltage increasing direction and a second, opposite, output voltage decreasing direction;

drive means connecting the actuator to the first and second cummutating members, the drive means including unidirectional clutch means effective to move the first commutating member in one direction to increase the number of cells connected across the output terminals with movement of the actuator means in its first direction and to move the second commutating member in the same one direction to decrease the number of cells connected across the output terminals with movement of the actuator means in its second direction, whereby the specific cells connected across the output terminals are changed with movement of the actuator means in the first and second directions to equalize the discharge of the cells with use.

2. A stepped voltage electric power supply for a vehicle mounted electric motor, comprising, in combination:

a plurality of contact pairs circumferentially arranged and regularly spaced;

a first rotary member having a plurality of contact members, one contact member for each contact pair except one, a first one of the contact members adjacent the unconnected contact pair providing an output terminal for the power supply;

a secondary rotary member having a single contact member disposed to connect one of the contact pairs and effective to provide another output terminal for the power supply;

actuator means movable in a first, output voltage increasing direction and a second, opposite, output voltage decreasing direction;

differential drive means connecting the actuator means to the first and second rotary means, the differential drive means including unidirectional clutch means for each of the first and second rotary members effective to rotate each only in the same one direction of rotation, the differential drive means being effective to rotate the second rotary member in the one direction with movement of the actuator means in the first direction, and to rotate the first rotary member in the one direction with movement of the actuator means in the second direction; and a plurality of electric battery cells, one of the cells being connected between each pair of contacts in consistent polarity for the contact members to connect the cells in series, whereby the cells connected in series between the first one contact member of the first rotary member and the single contact of the second rotary member provide an output voltage which changes, in steps, with each movement of the actuator means, and whereby, further, the individual cells so connected vary with each movement of the actuator means to even the power drain from the cells.

* * * * *